(12) United States Patent
Era et al.

(10) Patent No.: US 9,272,356 B2
(45) Date of Patent: Mar. 1, 2016

(54) FEED CONTROL METHOD FOR CONSUMABLE ELECTRODE AC ARC WELDING

(75) Inventors: Tetsuo Era, Osaka (JP); Futoshi Nishisaka, Osaka (JP); Hiroyasu Mondori, Osaka (JP); Akihiro Ide, Osaka (JP)

(73) Assignee: DAIHEN Corporation, Osaka (JP)

( * ) Notice: Subject to any disclaimer, the term of this patent is extended or adjusted under 35 U.S.C. 154(b) by 1594 days.

(21) Appl. No.: 12/077,641

(22) Filed: Mar. 20, 2008

(65) Prior Publication Data

US 2008/0237208 A1    Oct. 2, 2008

(30) Foreign Application Priority Data

Mar. 29, 2007    (JP) .................. 2007-086260

(51) Int. Cl.
*B23K 9/10*    (2006.01)
*B23K 9/12*    (2006.01)
*B23K 9/133*    (2006.01)

(52) U.S. Cl.
CPC ................. *B23K 9/124* (2013.01); *B23K 9/133* (2013.01)

(58) Field of Classification Search
CPC ..................................... B23K 9/09; B23K 9/10

USPC ................... 219/130.1, 130.5, 137.7, 130.51
See application file for complete search history.

(56) References Cited

U.S. PATENT DOCUMENTS

| 3,581,052 | A   | * | 5/1971  | Milton ...................... 219/130.21 |
| 6,297,473 | B2  | * | 10/2001 | Hiraoka et al. .......... 219/125.12 |
| 6,600,135 | B2  | * | 7/2003  | Tong ........................ 219/137 PS |
| 2004/0060913 | A1 |   | 4/2004  | Ueyama et al. |
| 2008/0156781 | A1 | * | 7/2008  | Artelsmair et al. ........ 219/130.5 |

FOREIGN PATENT DOCUMENTS

| JP | 62-55952    |   | 3/1987  |            |
| JP | 01245967 A  | * | 10/1989 | ............... B23K 9/00 |
| JP | 2002283050 A | * | 10/2002 | ............. B23K 9/073 |
| JP | 2004-114088 |   | 4/2004  |            |

* cited by examiner

*Primary Examiner* — Dana Ross
*Assistant Examiner* — Ayub Maye
(74) *Attorney, Agent, or Firm* — Hamre, Schumann, Mueller & Larson, P.C.

(57) ABSTRACT

A feed control method is provided for consumable electrode AC arc welding, in which the welding wire is fed at a predetermined wire feed rate, and a welding voltage applied to an arc is switched in alternation between positive polarity and negative polarity. In the method, a welding current setting signal is generated. The wire is fed at a first feed rate during a period of the positive polarity, whereas the wire is fed at a second feed rate different from the first feed rate during a period of the negative polarity.

3 Claims, 7 Drawing Sheets

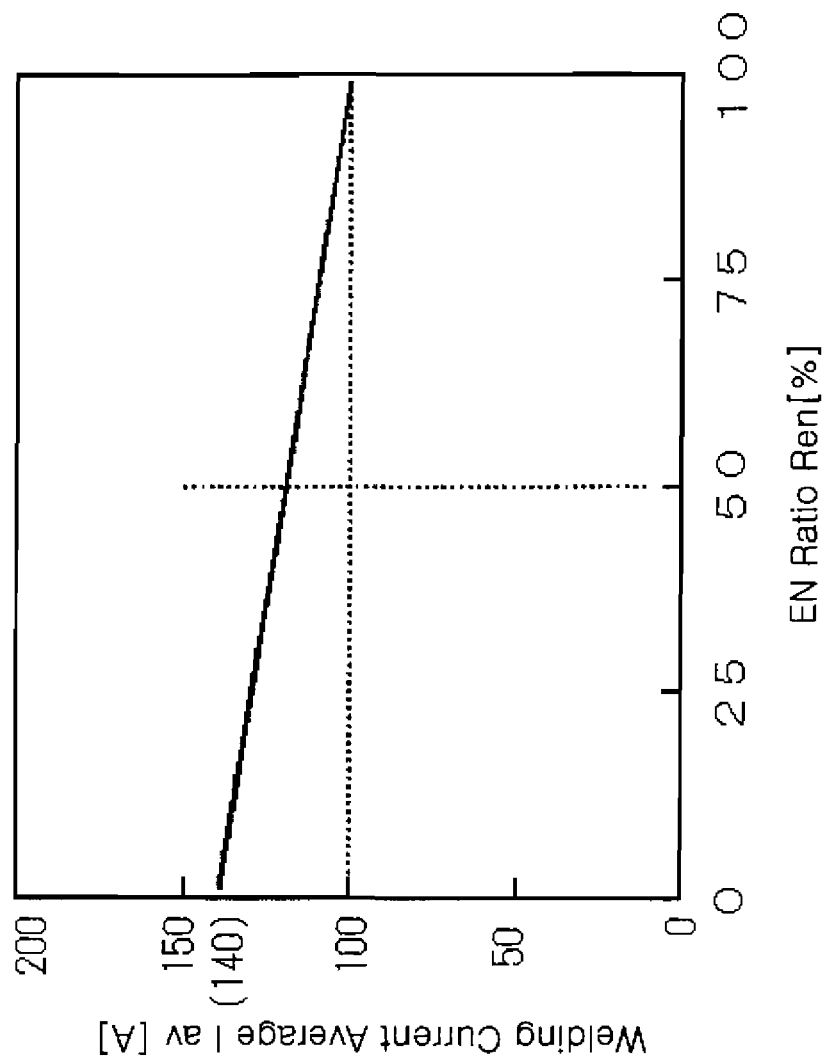

FEED CONTROL METHOD FOR CONSUMABLE ELECTRODE AC ARC WELDING

BACKGROUND OF THE INVENTION

1. Field of the Invention

The present invention relates to a feed control method for consumable electrode AC arc welding to obtain a desired bead shape.

2. Description of the Related Art

FIG. 5 is a current-voltage waveform diagram of consumable electrode AC arc welding. In the figure, (A) is a polarity switching signal Spn, (B) is the welding current Iw, (C) is the welding voltage Vw, and (D) is the welding wire feed rate Fw (cm/minute). The figure is for a case of short circuiting transfer arc welding, but substantially similar results are obtained for globular transfer welding and spray transfer welding. In the following explanation, the welding current Iw, welding voltage Vw, and output voltage E explained below refer to absolute values. Hence a statement "a value is large" means that the absolute value is large.

As shown in (A) in the figure, in consumable electrode AC arc welding, welding is performed while switching in alternation between an electrode positive polarity period Tep and an electrode negative polarity period Ten, according to a polarity switching signal Spn. At this time, as indicated in (D) in the figure, the feed rate Fw is constant, independent of the polarity.

As shown in (A) in the figure, at time t1, the polarity switching signal Spn goes to high level, switching to the electrode positive polarity EP, upon which, as shown in (B) in the figure, the welding current Iw for electrode positive polarity EP flows, and as shown in (C) in the figure, the welding voltage Vw of electrode positive polarity EP is applied between the welding wire and the base material. During the short circuit period Ts between times t1 and t2, as shown in (B) in the figure, the welding current Iw gradually increases, and as shown in (C) in the figure, the welding voltage Vw reaches a low short circuit voltage value of approximately several volts. During the arc period Ta between times t2 and t3, as shown in (B) in the figure, the welding current Iw gradually decreases, and as shown in (C) in the figure, the welding voltage Vw reaches the arc voltage value of approximately several tens of volts. Thereafter, until the electrode positive polarity period Tep ends at time t4, there is repetition of the short circuit period Ts and arc period Ta.

As shown in (A) in the figure, at time t4, the polarity switching signal Spn goes to low level, and when the welding power supply output switches to electrode negative polarity EN, an electrode negative polarity EN welding current Iw flows as shown in (B), and as shown in (C), the welding voltage Vw is applied. The short circuit period Ts between times t4 and t5 and the arc period Ta between times t5 and t6 are repeated as above until the end of the electrode negative polarity period Ten at time t7.

FIG. 6 shows an example of wire welding characteristics for electrode positive polarity EP and for electrode negative polarity EN. In the figure, the horizontal axis indicates the welding current average value for each polarity, and the vertical axis indicates the feed rate Fw. The figure shows results for MAG welding using an iron wire of diameter 1.2 mm. The following explanation references this figure.

As shown in the figure, the wire welding characteristics differ greatly for electrode positive polarity EP and for electrode negative polarity EN. As stated above, in consumable electrode AC arc welding, the feed rate Fw is a constant value independent of polarity, so that if for example the feed rate is set to Fw=350 cm/minute, the welding current average value for electrode positive polarity EP is Iep=140 A, and the welding current average value for electrode negative polarity EN is Ien=100 A. In FIG. 5, the average of the welding current value during the electrode positive polarity period Tep is the electrode positive polarity welding current average value Iep, and the average of the welding current value during the electrode negative polarity period Ten is the electrode negative polarity welding current average value Ien. In consumable electrode AC arc welding, the EN ratio Ren (%)=100×(Ten/(Tep+Ten)), which is the ratio of the above electrode positive polarity period Tep to the electrode negative polarity period Ten, may be varied to change the wire welding characteristics, so that a desired bead shape (penetration depth, reinforcement height, and similar) is obtained (see for example Japanese Patent Publication S62-55952, Japanese Patent Laid-open 2004-114088).

The welding current average value Iav over all periods (Tep+Ten) can be represented by the following equation, taking as parameters the electrode positive polarity welding current average value Iep, electrode negative polarity welding current average value Ien, and the EN ratio Ren.

$$Iav = (Ien - Iep) \times (Ren/100) + Iep \quad (1)$$

The numerical example explained above with reference to FIG. 6 is substituted into equation (1). That is, upon substituting Iep=140 A and Ien=100 A, the following is obtained.

$$Iav = -0.4 \times Ren + 100$$

This relation is plotted in the graph shown in FIG. 7. In the figure, the horizontal axis represents the EN ratio Ren, and the vertical axis indicates the welding current average value Iav. As is clear from the figure, when the EN ratio Ren changes, the welding current average value Iav varies significantly in a range of 100 to 140 A.

When forming beads into a desired shape on the workpiece, often the penetration depth and the area of the reinforcement portion are set to desired values. In general, the penetration depth changes with the welding current average value Iav, and the reinforcement area changes with the EN ratio Ren. However, as is clear from the figure, if the EN ratio Ren is changed in an attempt to set the reinforcement area, the welding current average value Iav also changes greatly at the same time, and the penetration depth also changes. That is, the penetration depth and the reinforcement area cannot be set independently to desired values. For this reason, numerous preparatory tests are necessary in order to set the bead shape to a desired value, and so considerable time has been required.

SUMMARY OF THE INVENTION

The present invention has been proposed under the circumstances described above. It is therefore an object of the present invention is to provide a feed control method for consumable electrode AC arc welding which enables easy setting to a desired bead shape.

According to the present invention, there is provided a feed control method for consumable electrode AC arc welding, in which a welding wire is fed at a predetermined wire feed rate, and a welding voltage applied to an arc is switched in alternation between electrode positive polarity and electrode negative polarity for performing welding. The method includes: generating a welding current setting signal; setting the wire feed rate to a first feed rate during a period of the electrode positive polarity, the setting to the first feed rate being based on both wire welding characteristics for the electrode positive polarity and the welding current setting signal; and setting the wire feed rate to a second feed rate during a period of the electrode negative polarity, the setting to the second feed rate being based on both wire welding characteristics for the electrode negative polarity and the welding current setting signal.

Preferably, the switching from the first feed rate to the second feed rate and/or the switching from the second feed rate to the first feed rate may be performed with a gradient.

Other features and advantages of the present invention will become apparent from the detailed description given below with reference to the accompanying drawings.

BRIEF DESCRIPTION OF THE DRAWINGS

FIG. 7 shows the relation between the EN ratio Ren and the welding current average value Iav, illustrating a problem of the prior art.

DETAILED DESCRIPTION OF THE PREFERRED EMBODIMENTS

The present invention will be described below with reference to the drawings.

Figure 1:
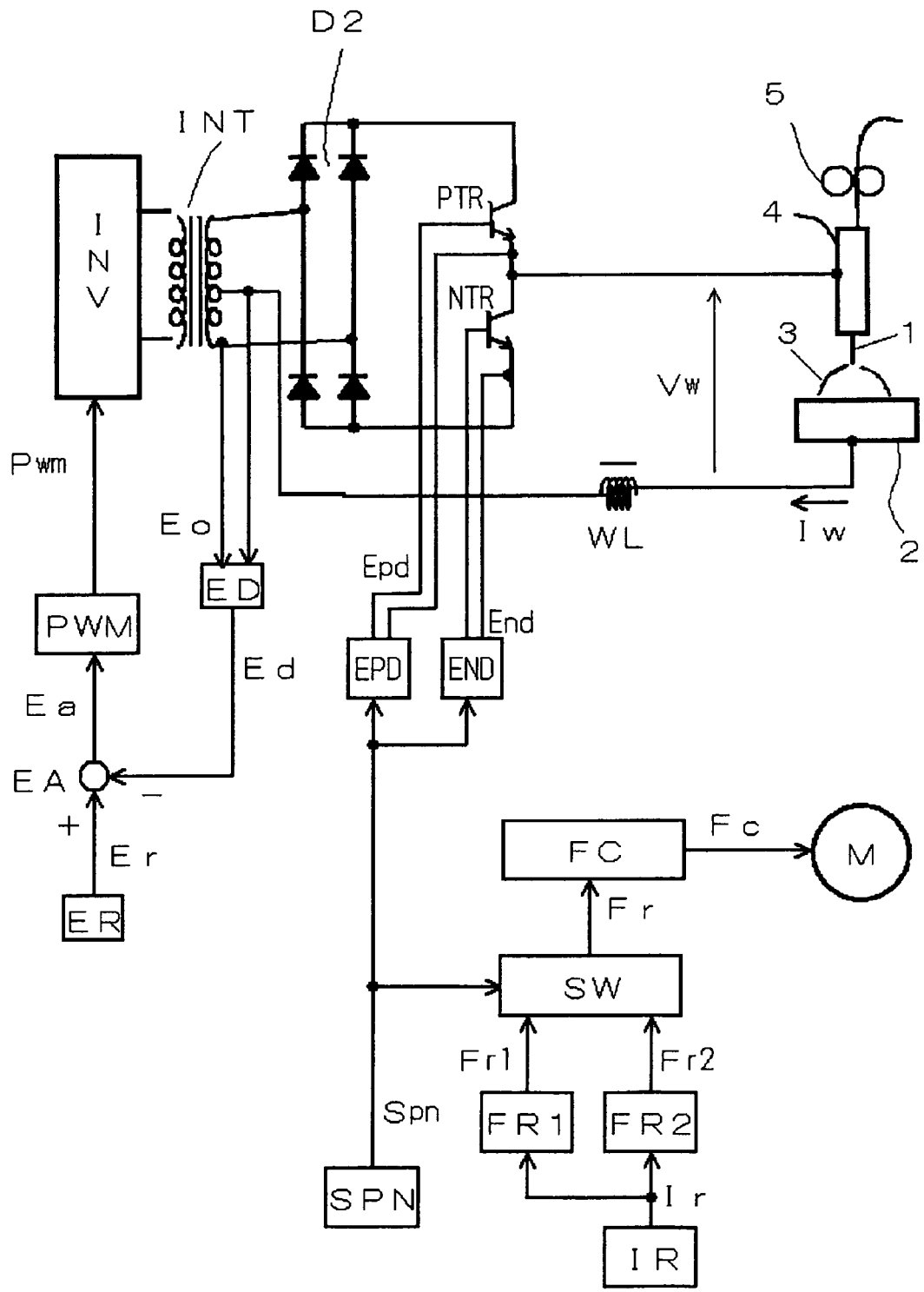
FIG. 1 is a block diagram showing a consumable electrode AC arc welding system to which the present invention is applied.

FIG. 1 is a block diagram showing a consumable electrode AC arc welding system to which the present invention is applied.

The inverter circuit INV takes as input a three-phase, 200 V or similar commercial power supply, and performs inverter control of a rectified DC voltage according to a pulse-width modulation signal Pwm, described below, to output a high-frequency alternating current. The high-frequency transformer INT converts the high-frequency alternating current into a voltage appropriate for welding. The secondary rectifier group D2 rectifies the converted high-frequency alternating current, and outputs positive and negative DC voltages. By executing on/off control of the electrode positive polarity switching element PTR and electrode negative polarity switching element NTR, the welding power supply output polarity is switched. When the electrode positive polarity switching element PTR is in the on state the electrode polarity is positive or EP, and when the electrode negative polarity switching element NTR is in the on state the electrode polarity is negative or EN. The reactor WL smoothes the output.

The welding wire 1 is fed through the welding torch 4 by a feed roller 5 connected to a feed motor M. An arc 3 is struck between the welding wire 1 and the base material 2.

The polarity switching signal generation circuit SPN outputs a polarity switching signal Spn which goes to high level during electrode positive polarity periods Tep, determined in advance, and goes to low level during electrode negative polarity periods Ten, determined in advance. The electrode positive polarity switching element driving circuit EPD outputs an electrode positive polarity switching element driving signal Epd when this polarity switching signal SPn is at high level. The electrode negative polarity switching element driving circuit END outputs an electrode negative polarity switching element driving signal End when the polarity switching signal Spn is at low level. Hence when the polarity switching signal Spn is at high level the electrode polarity is positive or EP, and when at low level the electrode polarity is negative or EN.

The output voltage setting circuit ER outputs an output voltage setting signal Er, determined in advance. The voltage detection circuit ED detects the AC voltage (output voltage E) in the secondary windings of the high-frequency transformer INT, converts the result into an absolute value, and outputs an output voltage detection signal Ed. The error amplification circuit EA amplifies the error between the output voltage setting signal Er and the output voltage detection signal Ed, and outputs an amplified error signal Ea. The pulse width modulation circuit PWM takes this amplified error signal Ea as input to perform pulse width modulation, and outputs a pulse width modulation signal Pwm.

Figure 2:
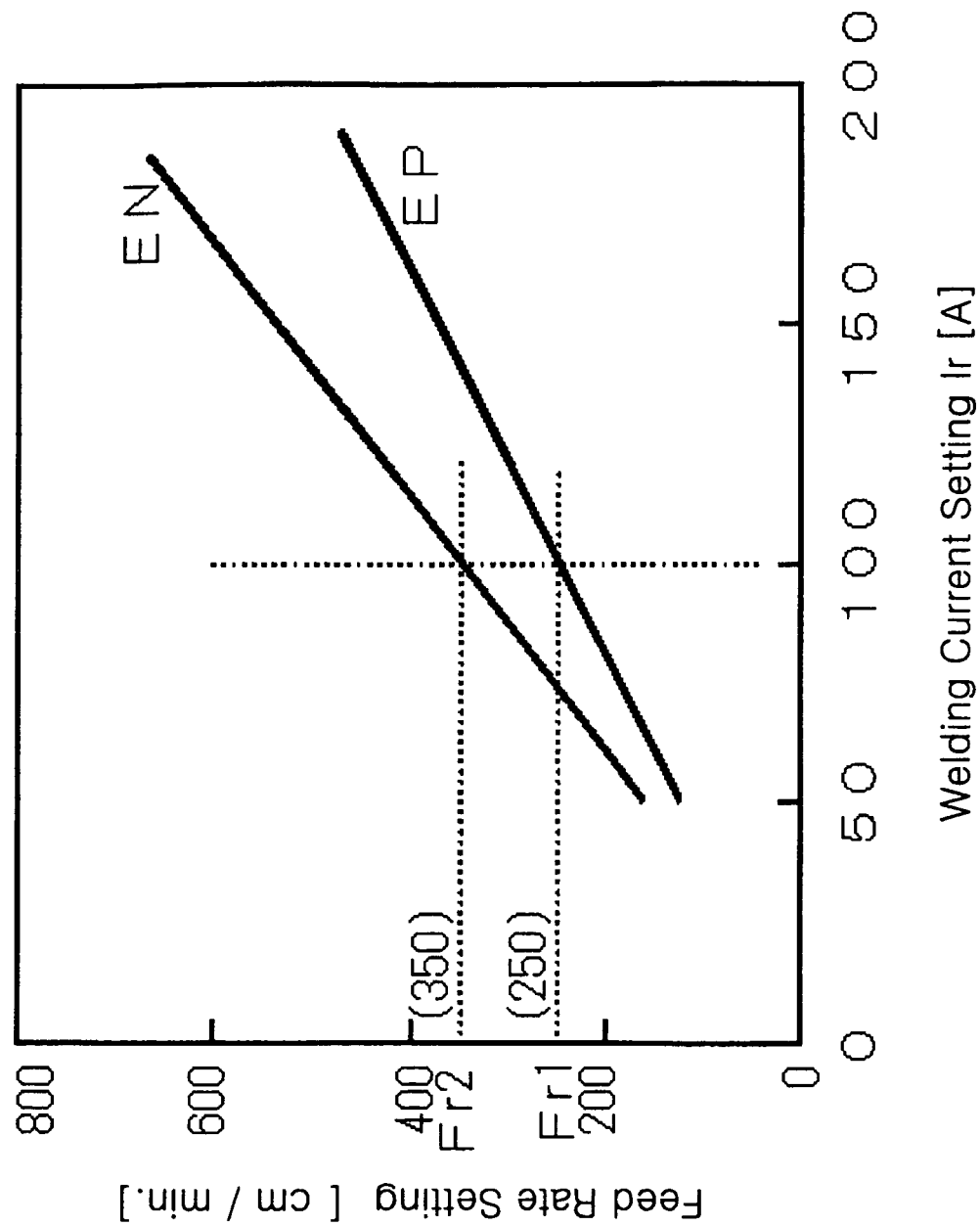
FIG. 2 shows the relation between the welding current setting Ir and the feed rate setting Fr for the two polarities.
Figure 6:
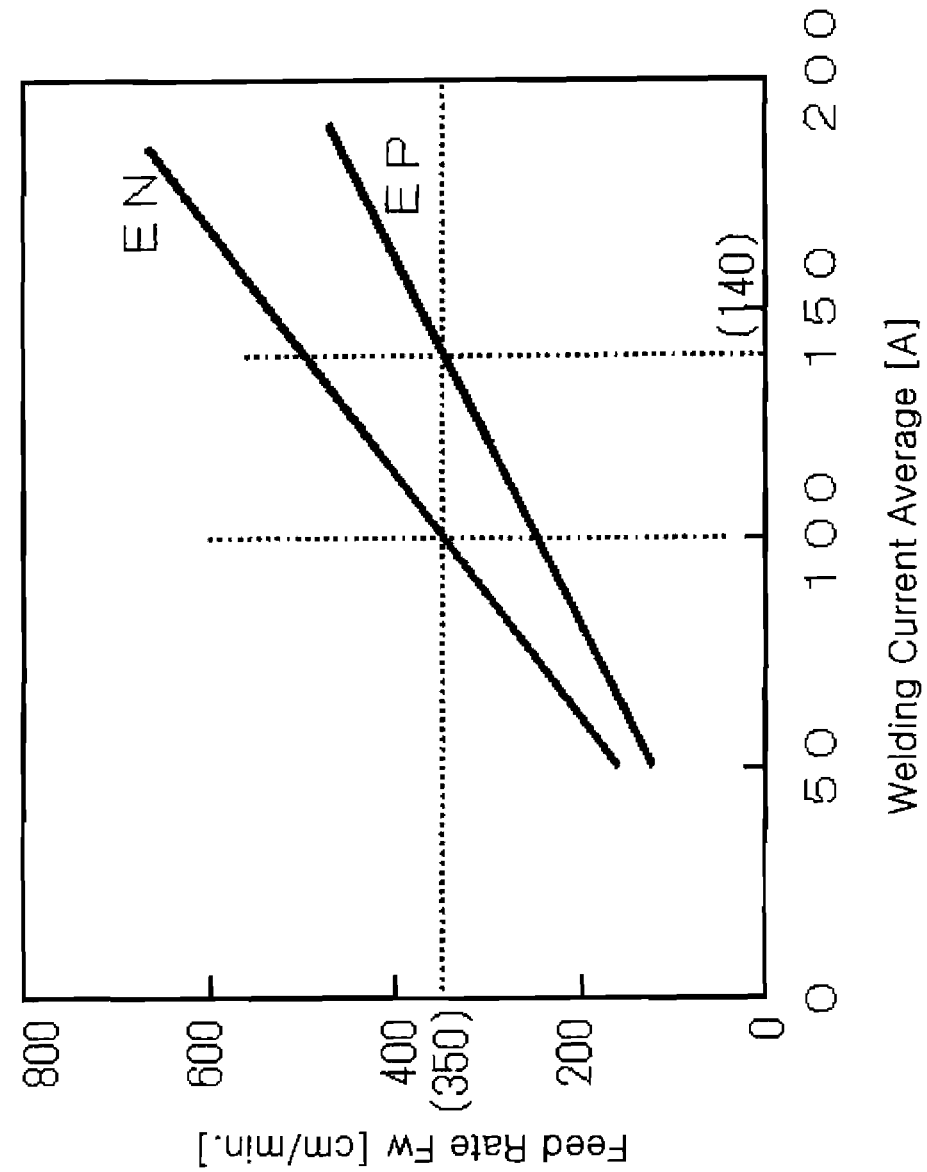
FIG. 6 shows the wire welding characteristics for each polarity in the prior art.

The welding current setting circuit IR outputs a welding current setting signal Ir to set the above-described welding current average value Iav. The first feed rate setting circuit FR1 takes as input the welding current setting signal Ir, and outputs a corresponding first feed rate setting signal Fr1 based on the wire welding characteristic for electrode positive polarity EP, explained below using FIG. 2. The second feed rate setting circuit FR2 takes as input the welding current setting signal Ir, and outputs a corresponding second feed rate setting signal Fr2 based on the wire welding characteristic for electrode negative polarity EN, explained below using FIG. 2. FIG. 2 shows the wire welding characteristics for each polarity. In the figure, the horizontal axis indicates the welding current setting Ir, and the vertical axis indicates the feed rate setting Fr. Similarly to FIG. 6 above, this figure shows as an example a case of MAG welding in which an iron wire of diameter 1.2 mm is used. The characteristic labeled "EP" indicates the wire welding characteristic for electrode positive polarity EP; the characteristic labeled "EN" indicates the wire welding characteristic for electrode negative polarity EN. For example, when the welding current setting Ir=100 A, the first feed rate setting Fr1=250 cm/minute, and the second feed rate setting Fr2=350 cm/minute. For each set of welding conditions (welding method, welding wire diameter, material, and similar), the wire welding characteristics for each polarity are stored internally, as functions, in tables, or similar, in the first feed rate setting circuit FR1 and in the second feed rate setting circuit FR2.

The switching circuit SW outputs the first feed rate setting signal Fr1 as the feed rate setting signal Fr when the polarity switching signal Spn is at high level (EP), and outputs the second feed rate setting signal Fr2 as the feed rate setting signal Fr when the polarity switching signal Spn is at low level (EN). The feed control circuit FC outputs a feed control signal Fc to cause feeding of the welding wire 1 at a feed rate equivalent to the value of this feed rate setting signal Fr. The feed motor M is driven by this feed control signal Fc, and feeds the welding wire 1 by means of the above-described feed roller 5.

Figure 3:
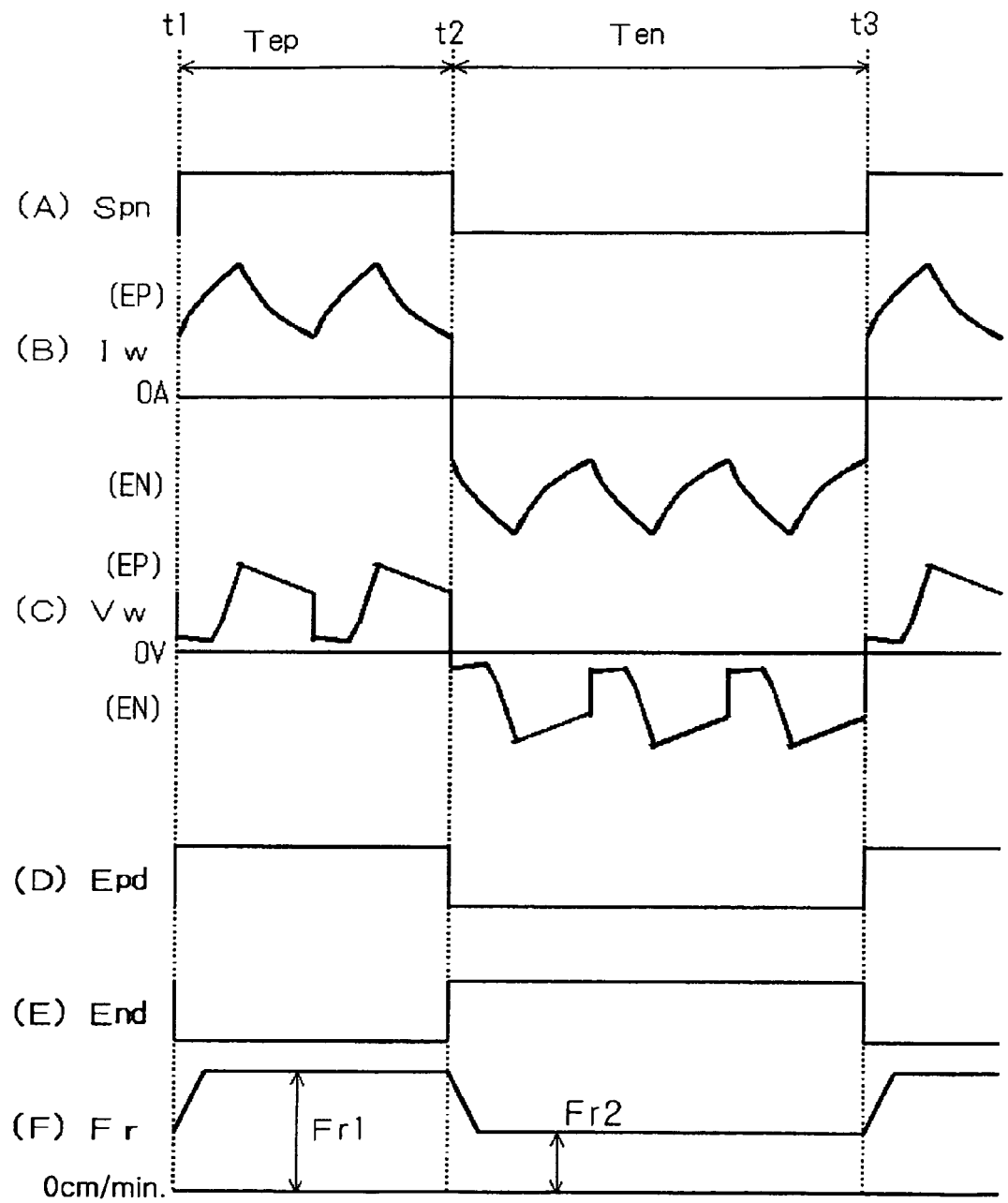
FIG. 3 is a timing chart of signals in the welding power supply of FIG. 1.

FIG. 3 is a timing chart of the various signals of the welding power supply described above using FIG. 1. FIG. 3(A) is the polarity switching signal Spn, FIG. 3(B) is the welding current Iw, FIG. 3(C) is the welding voltage Vw, FIG. 3(D) is the electrode positive polarity switching element driving signal Epd, FIG. 3(E) is the electrode negative polarity switching element driving signal End, and FIG. 3(F) is the feed rate setting signal Fr.

As shown in FIG. 3(A), when the polarity switching signal Spn goes to high level, the electrode positive polarity switching element driving signal Epd (high level) is output, as shown in FIG. 3(D), so that the electrode positive polarity switching element PTR is turned on, and the welding power supply output becomes the electrode positive polarity EP. During this electrode positive polarity period Tep, the electrode positive polarity EP welding current Iw is passed, as shown in FIG. 3(B), and the electrode positive polarity EP welding voltage Vw is applied between the wire 1 and the base material 2, as shown in FIG. 3(C). And as shown in FIG. 3(F), the value of the feed rate setting signal Fr is the value of the first feed rate setting signal Fr1 corresponding to the welding current setting signal Ir based on the wire welding characteristic for electrode positive polarity EP, explained above in FIG. 2.

As shown in FIG. 3(A) in the figure, at time t2 the polarity switching signal Spn goes to low level, and the electrode negative polarity switching element driving signal End (high level) is output, as shown in FIG. 3(E), so that the electrode negative polarity switching element NTR is turned on, and the welding power supply output becomes the electrode negative polarity EN. During this electrode negative polarity period Ten, the electrode negative polarity EN welding current Iw is passed, as shown in FIG. 3(B), and the electrode negative polarity EN welding voltage Vw is applied, as shown in FIG. 3(C). And as shown in FIG. 3(F), the value of the feed rate setting signal Fr is the value of the second feed rate setting signal Fr2 corresponding to the welding current setting signal Ir based on the wire welding characteristic for electrode negative polarity EN, explained above in FIG. 2.

As shown in FIG. 3(F), the feed rate setting signal Fr applies a gradient during switching from electrode positive polarity EP to electrode negative polarity EN, and/or during switching from electrode negative polarity EN to electrode positive polarity EP. This is done in order to prevent undershooting and overshooting of the feed rate at the time of switching. The gradient may be applied as necessary.

Figure 4:
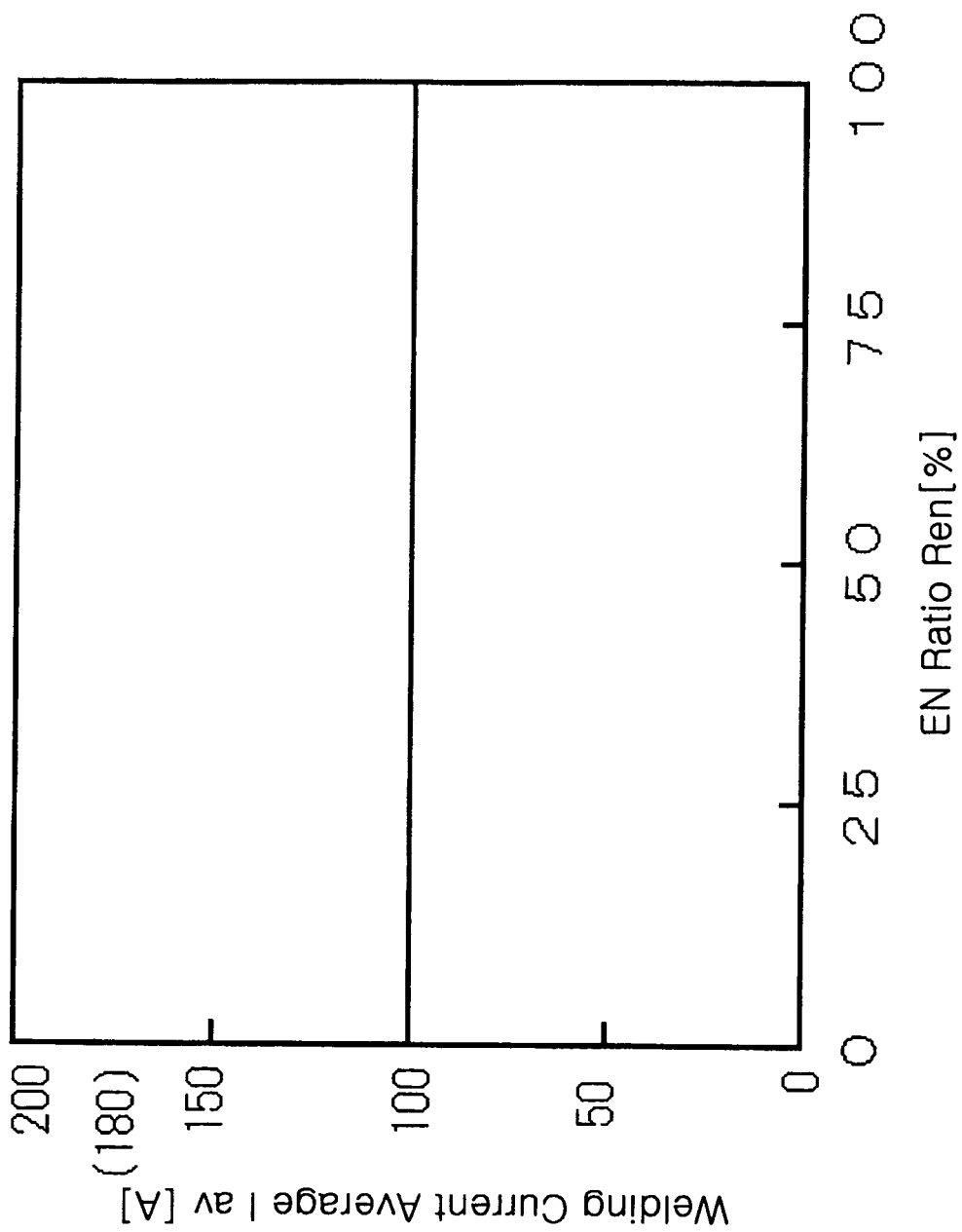
FIG. 4 shows the relation between the EN ratio Ren and the welding current average value Iav, illustrating one example of advantageous results of the present invention.
Figure 5:
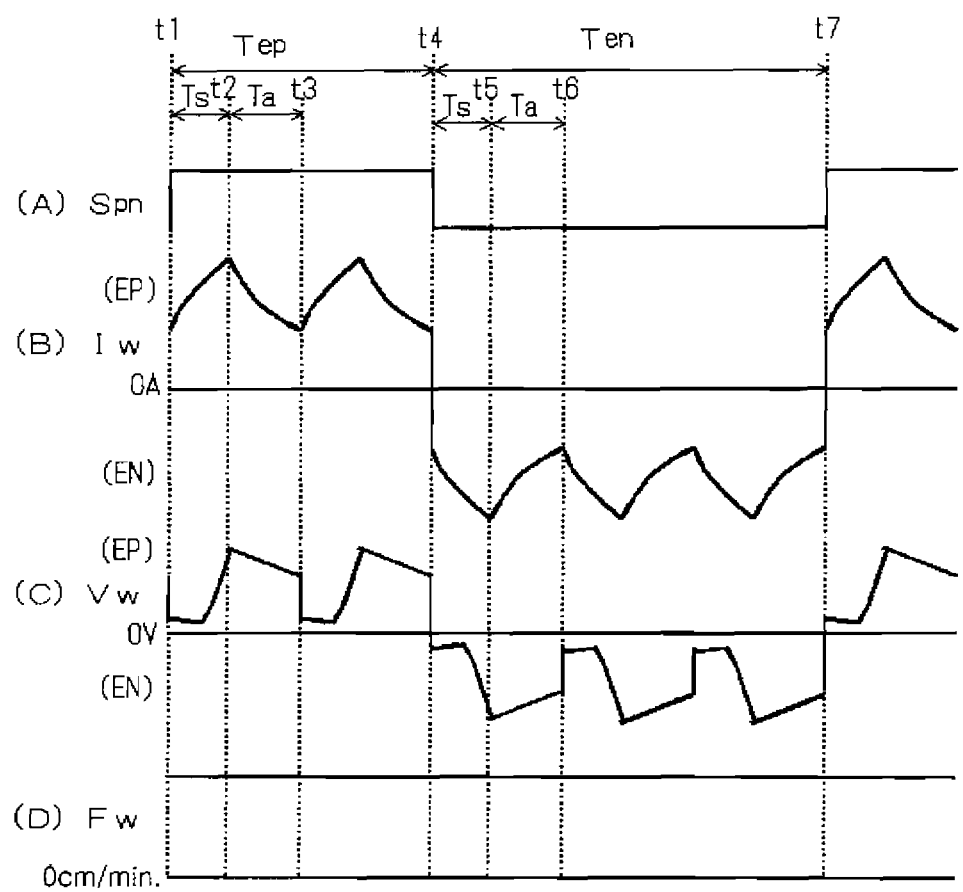
FIG. 5 is a current-voltage waveform diagram of consumable electrode AC arc welding of the prior art.

FIG. 4 shows changes in the welding current average value Iav when the EN ratio Ren is changed, in the above-described embodiment. This figure corresponds to FIG. 7. In this embodiment, feed rates are set for each polarity such that the electrode positive polarity welding current average value Iep and the electrode negative polarity welding current average value Ien are both equal to the welding current setting Ir. Hence Iav=Ir, and the welding current average value is independent of the EN ratio Ren. Similarly to the above-described FIG. 7, this figure is for a case of MAG welding at a welding current setting of Ir=100 A using an iron wire of diameter 1.2 mm. As shown in the figure, the welding current average value Iav remains at 100 A even when the EN ratio Ren changes. Hence in this embodiment, the welding current average value Iav and the EN ratio Ren can be set independently.

In the above embodiment, a case is described of short circuiting transfer welding. The present invention can also be applied to globular transfer welding, spray transfer welding, pulse arc welding, for example.

According to the above-described embodiment, by setting feed rates for each polarity corresponding to a welding current setting determined in advance based on the wire welding characteristics for each polarity, the EN ratio and the welding current average value can be set independently. As a result, the reinforcement area, which changes with the EN ratio, and the penetration depth, which changes with the welding current average value, can easily be set to a desired shape.

Further, by applying a gradient to the feed rate at the time of polarity switching, feed rate undershooting and overshooting can be prevented. Hence in addition to the above-described advantageous results, the stability of the welding state at the time of polarity switching can be improved.

The invention claimed is:

1. A feed control method for consumable electrode AC arc welding, in which a welding voltage applied to an arc is switched in alternation between electrode positive polarity and electrode negative polarity for performing welding while a welding wire is fed, the method comprising:
  generating a welding current setting signal for adjusting a welding current to a predetermined welding current setting;
  feeding the welding wire at a first feed speed during a period of the electrode positive polarity; and
  feeding the welding wire at a second feed speed different from the first feed speed during a period of the electrode negative polarity for making a welding current average value during the period of the electrode negative polarity equal to the predetermined welding current setting and to a welding current average value during the period of the electrode positive polarity.

2. The feed control method according to claim 1, wherein switching from the first feed speed to the second feed speed is performed with a gradient.

3. The feed control method according to claim 1, wherein switching from the second feed speed to the first feed speed is performed with a gradient.

* * * * *